(12) United States Patent
Ryshtun et al.

(10) Patent No.: US 11,475,703 B2
(45) Date of Patent: *Oct. 18, 2022

(54) PRESSURE DETECTION AND MEASUREMENT WITH A FINGERPRINT SENSOR

(71) Applicant: Cypress Semiconductor Corporation, San Jose, CA (US)

(72) Inventors: Andriy Ryshtun, Lviv (UA); Viktor Kremin, Lviv (UA)

(73) Assignee: Cypress Semiconductor Corporation, San Jose, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 16/998,179

(22) Filed: Aug. 20, 2020

(65) Prior Publication Data

US 2021/0097254 A1    Apr. 1, 2021

Related U.S. Application Data

(63) Continuation of application No. 16/224,137, filed on Dec. 18, 2018, now Pat. No. 10,762,325, which is a continuation of application No. 15/199,444, filed on Jun. 30, 2016, now Pat. No. 10,185,867.

(60) Provisional application No. 62/308,659, filed on Mar. 15, 2016.

(51) Int. Cl.
*G06V 40/12* (2022.01)
*G06V 40/13* (2022.01)
*G06F 3/041* (2006.01)

(52) U.S. Cl.
CPC .......... *G06V 40/1359* (2022.01); *G06F 3/041* (2013.01); *G06V 40/1306* (2022.01); *G06V 40/1382* (2022.01); *G06V 40/1388* (2022.01); *G06F 2203/04105* (2013.01)

(58) Field of Classification Search
None
See application file for complete search history.

(56) References Cited

U.S. PATENT DOCUMENTS

| 6,512,381 | B2 * | 1/2003 | Kramer | A61B 5/1172 324/658 |
|---|---|---|---|---|
| 7,280,679 | B2 | 10/2007 | Russo | |
| 8,866,347 | B2 | 10/2014 | Benkley | |
| 9,104,898 | B2 | 8/2015 | Case | |
| 10,185,867 | B1 * | 1/2019 | Ryshtun | G06K 9/00114 |

(Continued)

FOREIGN PATENT DOCUMENTS

| CN | 105094443 A | 11/2015 |
|---|---|---|
| WO | 2016055007 A1 | 4/2016 |

OTHER PUBLICATIONS

Hsiung, Yung-Shih, et al., A CMOS capacitive pressure sensor chip for fingerprint detection, IEEE Xplore Digital Library, 2011, 1 Page.

(Continued)

*Primary Examiner* — Delomia L Gilliard (57) ABSTRACT

A circuit, system, and method for measuring or detecting pressure or force of a fingerprint on an array of electrodes is described. Pressure or force may be measured or detected using a processed image of the fingerprint, or by measurement of capacitance of deformed variable capacitors.

20 Claims, 10 Drawing Sheets

(56) References Cited

U.S. PATENT DOCUMENTS

| | | | |
|---|---|---|---|
| 2006/0181521 A1* | 8/2006 | Perreault | G06K 9/00013 345/173 |
| 2008/0166028 A1 | 7/2008 | Turek et al. | |
| 2008/0235762 A1 | 9/2008 | Gutta | |
| 2010/0201650 A1* | 8/2010 | Son | G06F 3/0447 345/174 |
| 2013/0147752 A1* | 6/2013 | Simmons | G06F 3/0443 345/174 |
| 2014/0152609 A1* | 6/2014 | Kim | G06F 3/044 345/174 |
| 2014/0267152 A1* | 9/2014 | Curtis | G06F 3/0446 345/174 |
| 2015/0103043 A1* | 4/2015 | Hills | G06F 3/0443 345/174 |
| 2015/0162932 A1 | 6/2015 | Page et al. | |
| 2015/0261349 A1* | 9/2015 | Yoon | G06F 3/04166 345/174 |
| 2015/0268750 A1* | 9/2015 | Kwon | G06F 3/0445 345/173 |
| 2016/0005352 A1 | 1/2016 | Kim et al. | |
| 2016/0078268 A1 | 3/2016 | Mankowski et al. | |
| 2016/0148034 A1 | 5/2016 | Kremin et al. | |
| 2016/0259489 A1* | 9/2016 | Yang | G09G 5/12 |
| 2017/0255293 A1* | 9/2017 | Sundara-Rajan | G06F 3/04186 |
| 2017/0262720 A1 | 9/2017 | Hwang et al. | |
| 2017/0322649 A1* | 11/2017 | Wang | G06F 3/0443 |

OTHER PUBLICATIONS

USPTO Non Final Rejection for U.S. Appl. No. 15/199,444 dated Mar. 26, 2018; 11 pages.

USPTO Non-Final Rejection for U.S. Appl. No. 16/224,137 dated Jan. 24, 2020; 7 pages.

USPTO Notice of Allowability for U.S. Appl. No. 16/224,137 dated Jul. 6, 2020; 4 pages.

USPTO Notice of Allowance for U.S. Appl. No. 15/199,444 dated Oct. 18, 2018; 8 pages.

USPTO Notice of Allowance for U.S. Appl. No. 16/224,137 dated May 7, 2020; 8 pages.

* cited by examiner

PRESSURE DETECTION AND MEASUREMENT WITH A FINGERPRINT SENSOR

RELATED APPLICATIONS

This application is a Continuation of U.S. patent application Ser. No. 16/224,137, filed on Dec. 18, 2018, which is a Continuation of U.S. patent application Ser. No. 15/199,444, filed on Jun. 30, 2016, now U.S. Pat. No. 10,185,867, issued on Jan. 22, 2019, which claims the benefit of U.S. Provisional Patent Application No. 62/308,659, filed Mar. 15, 2016, all of which are incorporated by reference herein in their entirety.

TECHNICAL FIELD

The present disclosure relates generally to sensing systems, and more particularly to fingerprint sensing systems configurable to measure pressure on a fingerprint sensor.

BACKGROUND

Capacitance sensing systems can sense electrical signals generated on electrodes that reflect changes in capacitance. Such changes in capacitance can indicate a touch event (e.g., the proximity of an object to particular electrodes). Capacitive sense elements may be used to replace mechanical buttons, knobs and other similar mechanical user interface controls. The use of a capacitive sense element allows for the elimination of complicated mechanical switches and buttons, providing reliable operation under harsh conditions. In addition, capacitive sense elements are widely used in modern customer applications, providing new user interface options in existing products. Capacitive sense elements can range from a single button to a large number arranged in the form of a capacitive sense array for a touch-sensing surface. In other cases, capacitive sense elements may be configured to detect capacitance change caused by features of a fingerprint.

Fingerprint or other biometric information may be used to gate access to a variety of functions and applications. The same sensors may be configured to use information that is gathered for biometric security for other, non-secure functions, such as pressure detection and navigation.

DETAILED DESCRIPTION

Figure 1:
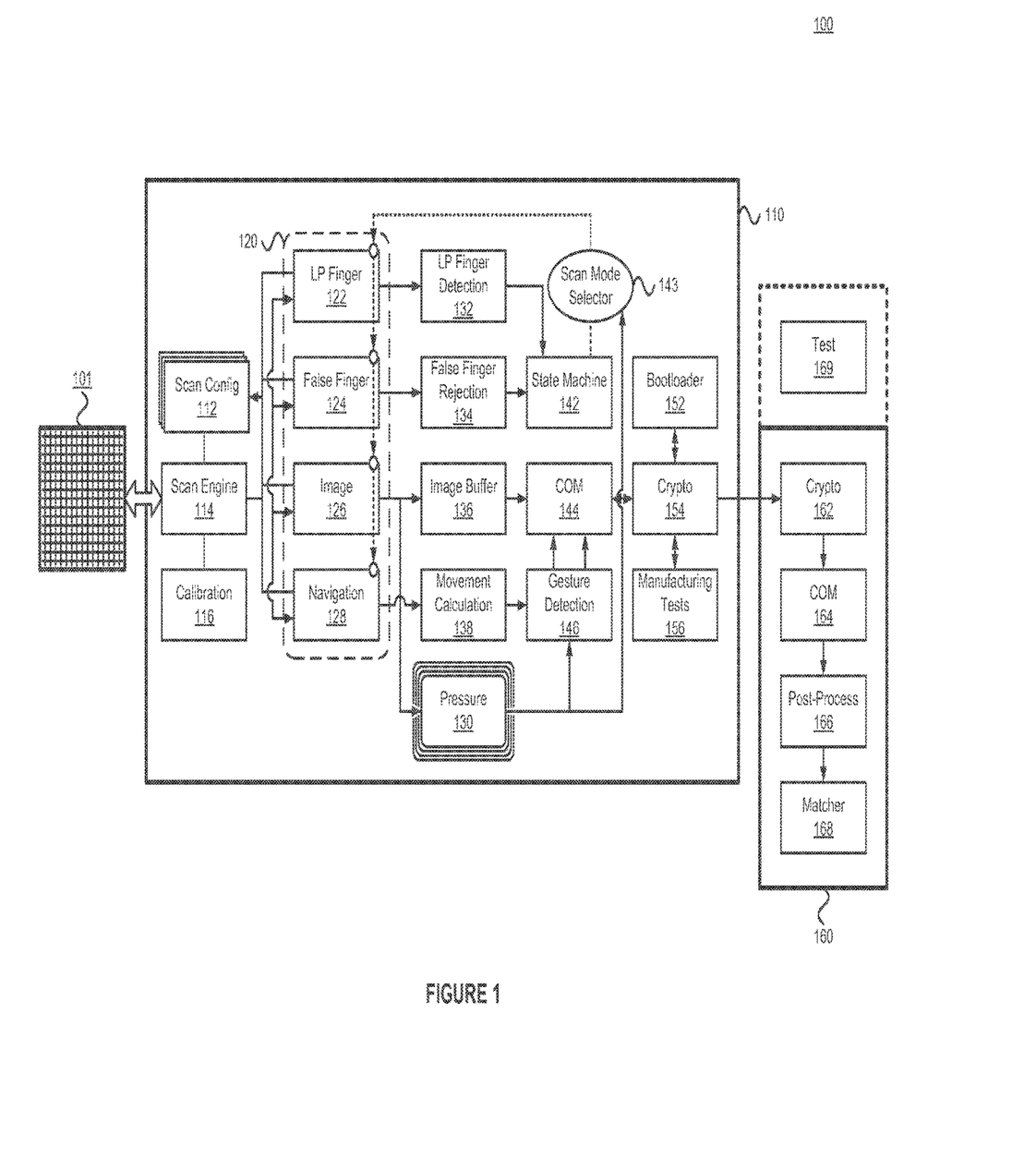
FIG. 1 illustrates a system including a fingerprint sensor configurable to measure or sense pressure, according to one embodiment.

FIG. 1 illustrates a system 100 configurable to detect pressure, gesture, or navigation actions on a fingerprint sensor. System 100 may include an array of fingerprint sensing electrodes 101 coupled to a sensing and processing circuit 110. In one embodiment, sensing electrodes 101 may be disposed as an X/Y grid, such that a mutual capacitance is formed at the intersection (or "node" or "pixel") of each X-axis electrode and each Y-axis electrode. The conversion of the mutual capacitance at each intersection to a digital value and the comparison of that digital value to a reference value may be used to detect the presence, absence, proximity, or pressure of a finger or fingerprint feature on the array of fingerprint sensing electrodes 101. The conversion of the mutual capacitance at each intersection to a digital value may be done by any number of methods common in the art. One of ordinary skill in the art will appreciate that the various capacitance-to-code conversion methods have strengths and weaknesses and would choose a method that is optimized for the fingerprint sensing system of a given application.

Fingerprint sensing electrodes 101 may be coupled to sensing and processing circuit 110 through scan engine module 114, which may be configured to convert the mutual capacitance at intersections of the sensing electrodes 101 to a digital value. Scan engine module 114 may receive configuration information from scan configuration module 112. This configuration information may be used to set up scan engine module 114 to measure the mutual capacitance between the sensing electrodes 101 using a specific capacitance-to-code conversion method. The configuration information may be used to set up scan engine module 114 to measure specific mutual capacitances in specific configurations for power saving, proximity calibration, or other functions. Configuration information may also be used to configure scan engine 114 for non-fingerprint sensing operations, such as for power-up, low-power operation, navigation, gesture detection, and other system or user functions. Scan engine module 114 may be coupled to calibration module 116. Calibration module 116 may receive digital values from scan engine module 114 for use in start-up, baseline tracking, and sensitivity adjustments. In one embodiment calibration module 116 may provide data used by scan configuration module 112 to change parameters of scan engine 114 as described above.

The output of scan engine 114 may be processed by a number of scan mode modules 120, which may take the digital output of scan engine 114 and begin processing the digital output based on system requirements. Scan mode modules 120 may include low-power finger module 122, which may process the digital output of a subset of sensing electrodes 101 or may process the digital values of sensing electrodes 101 that are scanned by scan engine 114 at different rates for low-power operation. Scan mode modules 120 may include false finger module 124, which may be used to configure scan engine 114 to scan sensing electrodes 101 to distinguish between real, live fingers and other conductive objects that may be placed on sensing electrodes 101. Scan mode modules 120 may include imaging module 126, which may be used to create an image of a fingerprint of a finger on sensing electrodes 101 based on the digital values for each intersection of the array or a subset of the intersections. Scan mode modules 120 may also include a navigation module 128 that may configure scan engine 114 to detect movement of a conductive object on sensing electrodes 101.

The output of the various modules of scan mode modules 120 may be processed or converted for their desired functions or for other downstream functions. The output of the low power finger module 122 may be processed by low-power finger detection module 132 to determine if a finger or other conductive object is present on or in proximity to sensing electrodes 101. False finger module 124 may output to a false finger rejection module 134 that may be configured to prevent sensing or validation of non-finger objects or as part of anti-spoofing operations or to detect and avoid detection of inadvertent contact with sensing electrodes 101. The outputs of low-power finger detection module 132 and false finger rejection module 134 may be output to a state machine 142 that may be configured to decide an operational mode for scan mode modules 120 through scan mode selector 143. Navigation module 128 may output data to a movement calculation module that may be configured to convert the output of scan engine 114 to an XYZ value representative of movement of a conductive object over the sensing electrodes 101.

Imaging module 126 may output a digital representation of a fingerprint on sensing electrodes 101 to an image buffer 136 that may be used to store the digital representation of the fingerprint for use in enrollment, validation, and access operations that may be communicated to various elements of system 100 through communication module (COM) 144. The output of imaging module 126 may also be output to a pressure detection module 130 that may be configured to detect a force placed on sensing electrodes 101 by a finger. In one embodiment, the detected force may be calculated as a discrete (direct) value. In another embodiment, the detected force may be a relative value, or a proportion of the maximum possible force discussed below. The outputs of movement calculation module 138 and pressure detection module 130 may be output to gesture detection module 146, which may be configured to interpret movement and pressure into at least one defined user interaction and to communicate that to elements of system 100 through COM 144. The output of COM 144 may be passed through a crypto module 154, which may provide an additional level of security and anti-spoofing as information is passed from processing circuit 110 to an external device 160. Processing circuitry 110 may also include a bootloader module 152 coupled through crypto module 154 for use in updating programming information of processing circuit 110. Processing circuitry 110 may also include a manufacturing test module 156, which may be use to ensure that system 100 is operating satisfactorily. The input and output from manufacturing test module 156 may be through crypto module 154 to ensure that device security is maintained.

The outputs of the various modules of processing circuitry 110 may be passed to external device 160 through crypto module 154 of processing circuitry 110 and crypto module 162 of external device 160. Communication module (COM) 164 may receive the output of crypto module 162 and apply additional processing through post-processing module 166. In one embodiment, the output of post-processing module 166 may be passed to a matcher module 168, which may be used to compare the output of imaging module 126 to a library of fingerprint images (or digital representations of fingerprint images) for use in validation, authentication, and access operations. External device 160 may also include a testing module 169, used in test and validation of system 100. In one embodiment, testing module 169 is part of the same external device that includes matcher module 168. In another embodiment testing module 169 may be a part of separate external device used only for manufacturing and test.

Figure 2:
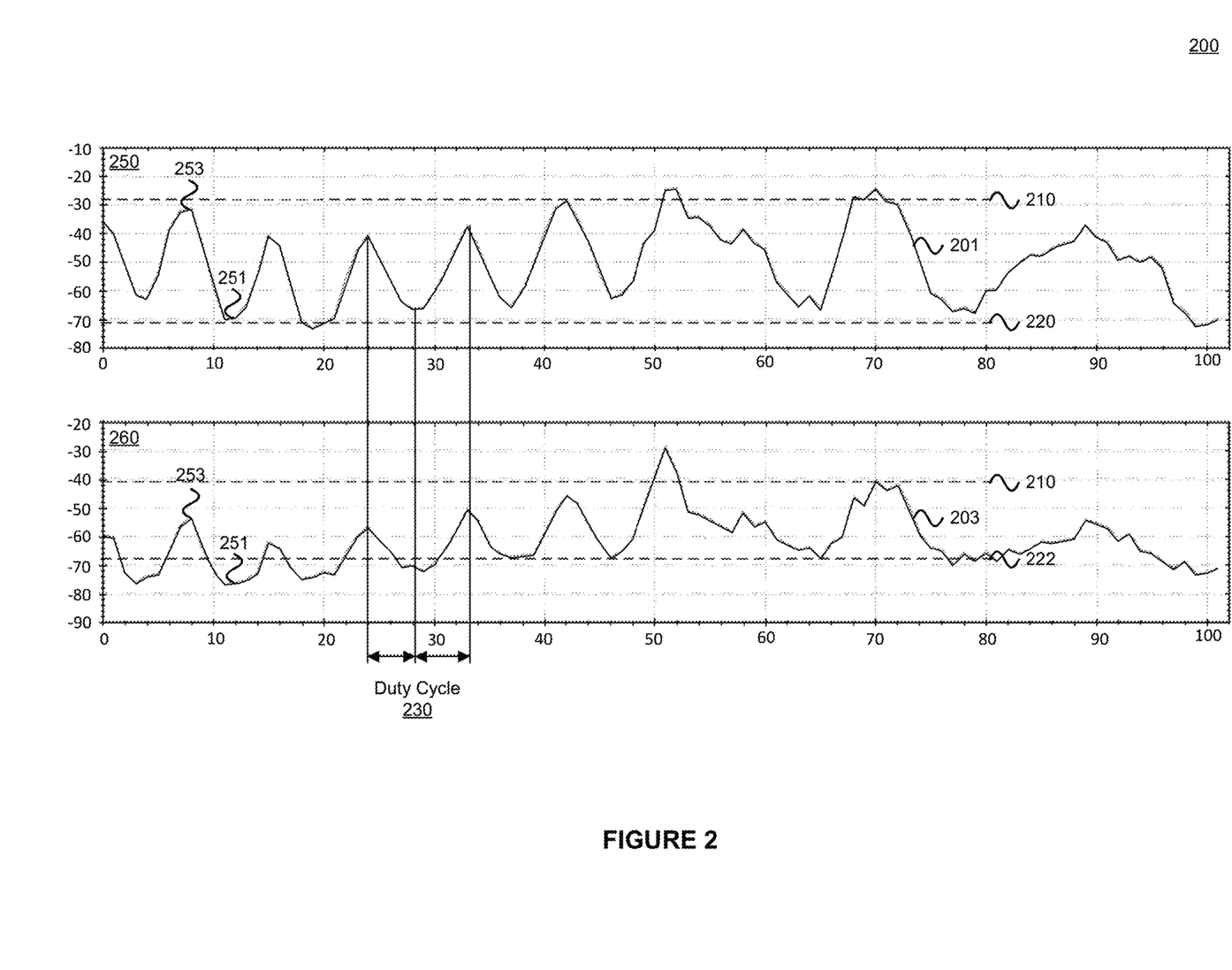
FIG. 2 illustrates ridges and valleys of a fingerprint at different pressures, according to one embodiment.

Fingerprints are comprised of ridges and valleys that may form a variety of more complex structures or patterns, such as arches, loops, and whorls. Additional features may be ridge endings, bifurcations, and short ridges or dots. FIG. 2 illustrates a visualization 200 of ridges and valleys along an axis of an array of sensing electrodes (see sensing electrodes 101 of FIG. 1). Line 201 of graph 250 illustrates a plurality of ridges 251 and valleys 253 that may be detected when a fingerprint is placed on sensing electrodes with a first amount of pressure. The difference between the valley level 210 and the ridge level 220 represents a contrast of the fingerprint image. Larger contrasts, corresponding to greater differences between the outputs of scan engine 114 corresponding to ridges and valleys, indicate less force or pressure applied to the fingerprint that is in capacitively coupled to the sensing electrodes. Line 203 of graph 260 illustrates the plurality of ridges 251 and valleys 253, but when the fingerprint is placed on sensing electrodes at a second (greater) amount of force. Note, valleys 253 of the fingerprint of line 203 are "shallower" relative to ridges 251 and the fingerprint is compressed against the surface of the fingerprint sensing device (which includes sensing electrodes 101 as described with regard to FIG. 1. Less contrast, corresponding to smaller differences between ridge level 222 and valley level 212 may indicate greater pressure applied to the fingerprint that is capacitively coupled with the sensing electrodes FIG. 2 also illustrates a duty cycle 230 between ridges 251 and valleys 253, which may be used to calculate pressure or force of a finger on the fingerprint sensing device. A proportion of duty cycle 230 to the difference between valleys 253 and ridges 251 may be used to calculate force. As duty cycle 230 increases, a larger difference between capacitive values corresponding to ridges 251 and valleys 253 may be necessary to recognize pressures or forces. While the embodiment of FIG. 2 illustrates that duty cycle 230 is derived from the distance between two valleys, one of ordinary skill in the art would understand that duty cycle 230 may also be derived from the distance between to ridges.

As can be seen in visualization 200, greater pressure of a fingerprint on the fingerprint sensor results in the valleys that are not as "deep" as those with lower pressure. This is because the fingerprint is compressed and the valley is brought closer to the sensing electrodes. As the fingerprint is imaged (for example, by imaging module 126 of FIG. 1), the compression of the fingerprint may result in an image with less contrast.

In one embodiment, the difference in values corresponding to ridges 251 and valleys 253 maybe used to calculate force or pressure. As the difference is decreased, greater pressure or force may be detected. That is, in one embodiment, smaller differences between capacitance measurements of ridges and valleys correspond to greater pressure or force applied to the fingerprint on the sensing electrodes.

Figure 3:
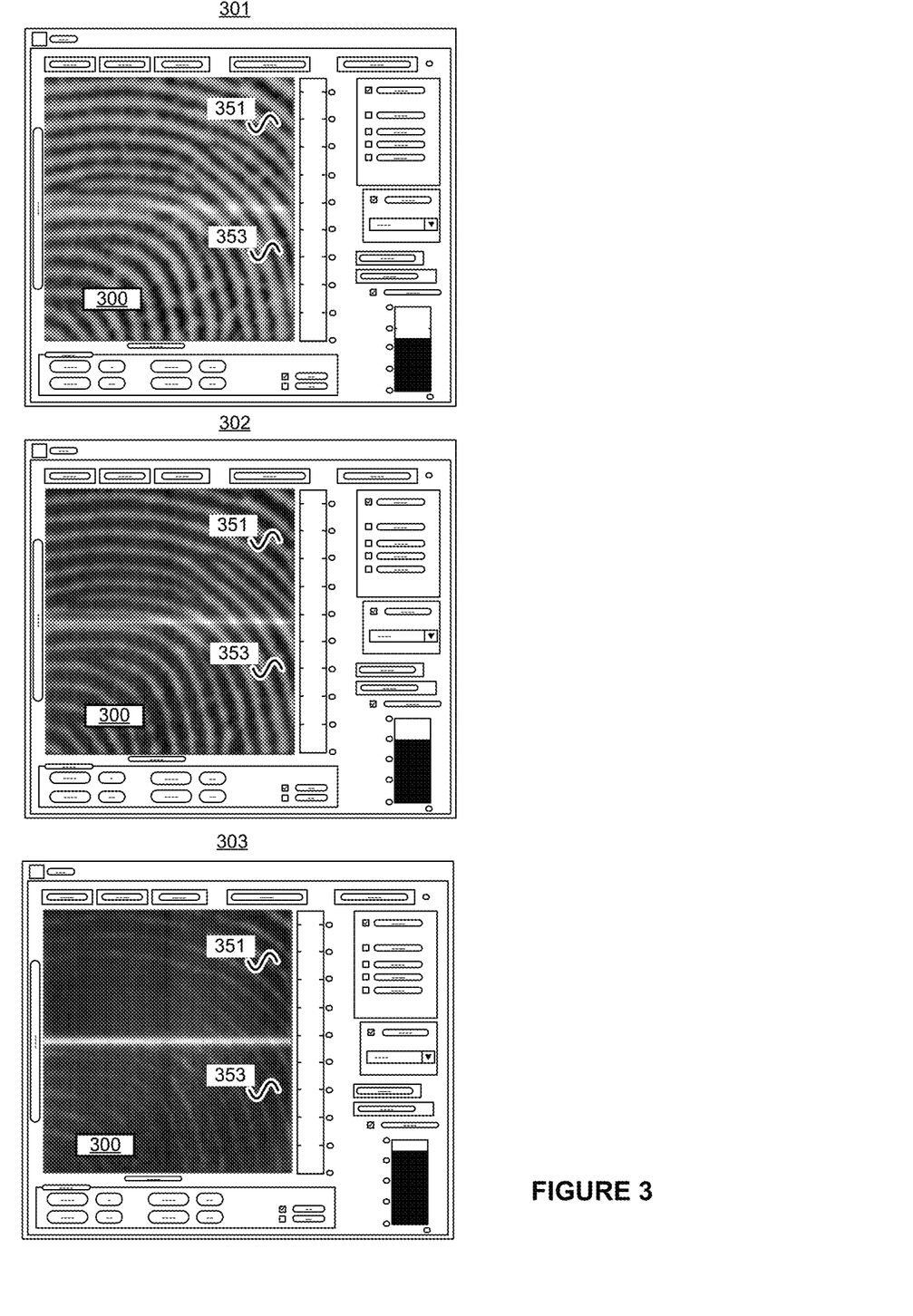
FIG. 3 illustrates graphical representations of fingerprint at different pressures, according to one embodiment.

FIG. 3 illustrates three images 301-303 of the same fingerprint 300 taken with three different pressures or forces. Image 301 illustrates that the ridges 351 of fingerprint 300 are quite a bit "darker" that the valleys 353. This results from the valleys being father away from the sensing electrodes that the ridges. Image 302 is the same fingerprint 300, but with greater pressure or force applied. As valleys 353 get closer to the sensing electrodes, the amount of capacitance change at locations corresponding to valleys 353 is increased, making the "darker" as generated by the imaging module. Finally, image 303 shows the same fingerprint 300 with even more pressure force applied. Valleys 353 are almost indistinguishable from the ridges and the fingerprint features are collapsed. Image 303 is considerably "darker", on the whole, than image 301.

The darkness of a ridge or valley is indicative of the capacitance change on the sensing electrodes that occurs by its presence. This means that the darker valleys represent a greater capacitance change. Capacitance change may be represented by a digital value (as discussed above with regard to scan engine 114). Looking again at images 301-303, there is greater capacitance change in image 303 than there is in image 302. There is also greater capacitance change in image 302 than there is in image 301. As valleys 353 are closer to the sensing electrodes in images 302 and 303, the mean value of the capacitance change increases. That is, for all intersections (or pixels) that are under test, the average change in capacitance is greater when more pressure is applied.

The average change in capacitance in various embodiments may be the mean, the median, or the mode. In other embodiments, the average change may be a weighted mean, or an average of groups of intersections or intersections over repeated scans.

Figure 4:
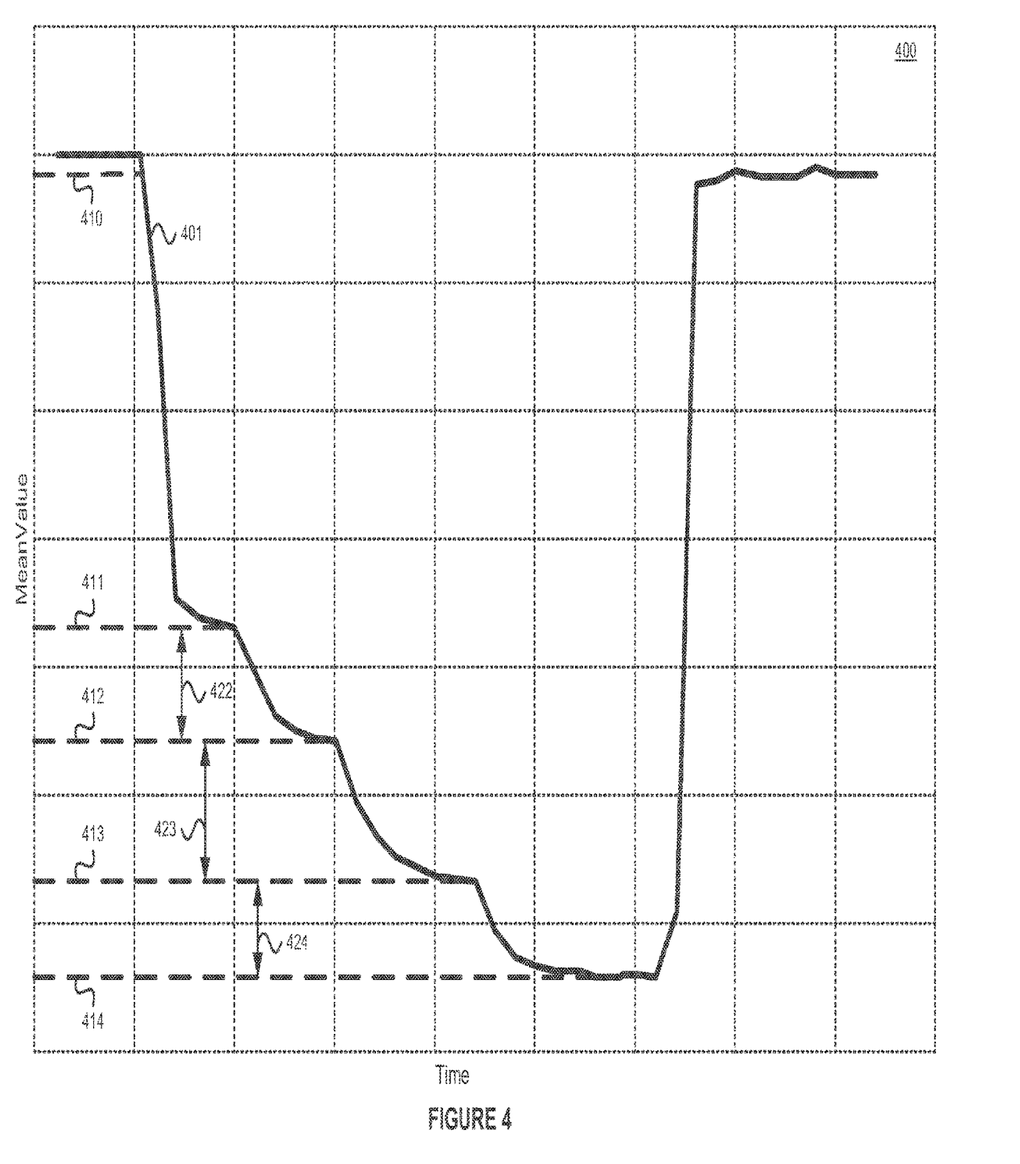
FIG. 4 illustrates digital responses to different pressures of a fingerprint on a fingerprint sensor, according to one embodiment.

FIG. 4 illustrates a graph 400 with a number of forces that are applied over time. Line 401 represents the capacitance change represented by the average of all intersections (or pixels) under test. A first threshold 410 may be used to determine that there is or is not a fingerprint on sensing electrodes. Pressure thresholds 411, 412, 413, and 414 may correspond to different pressure levels (as may be conceptualized by images 301-303 of FIG. 3). Pressure or force may be represented by a pressure value and not as a discrete pressure unit or unit of force (such as Newtons). As the average capacitance change of the intersections under test passes threshold 411, a first pressure may be detected. The first pressure may be discrete or it may be relative. If a change in the average capacitance change on the intersections under test is great enough to pass threshold 412, a second pressure level may be detected. The difference 422 between threshold 411 and threshold 412 may be dynamic or fixed. It may be derived from the capacitance change when a line 401 drops below threshold 410, or it may be hard-coded. Similarly as the average capacitance change passes thresholds 413 and 414 (with differences 423 and 424), third and fourth pressures may be detected, respectively.

Figure 5:
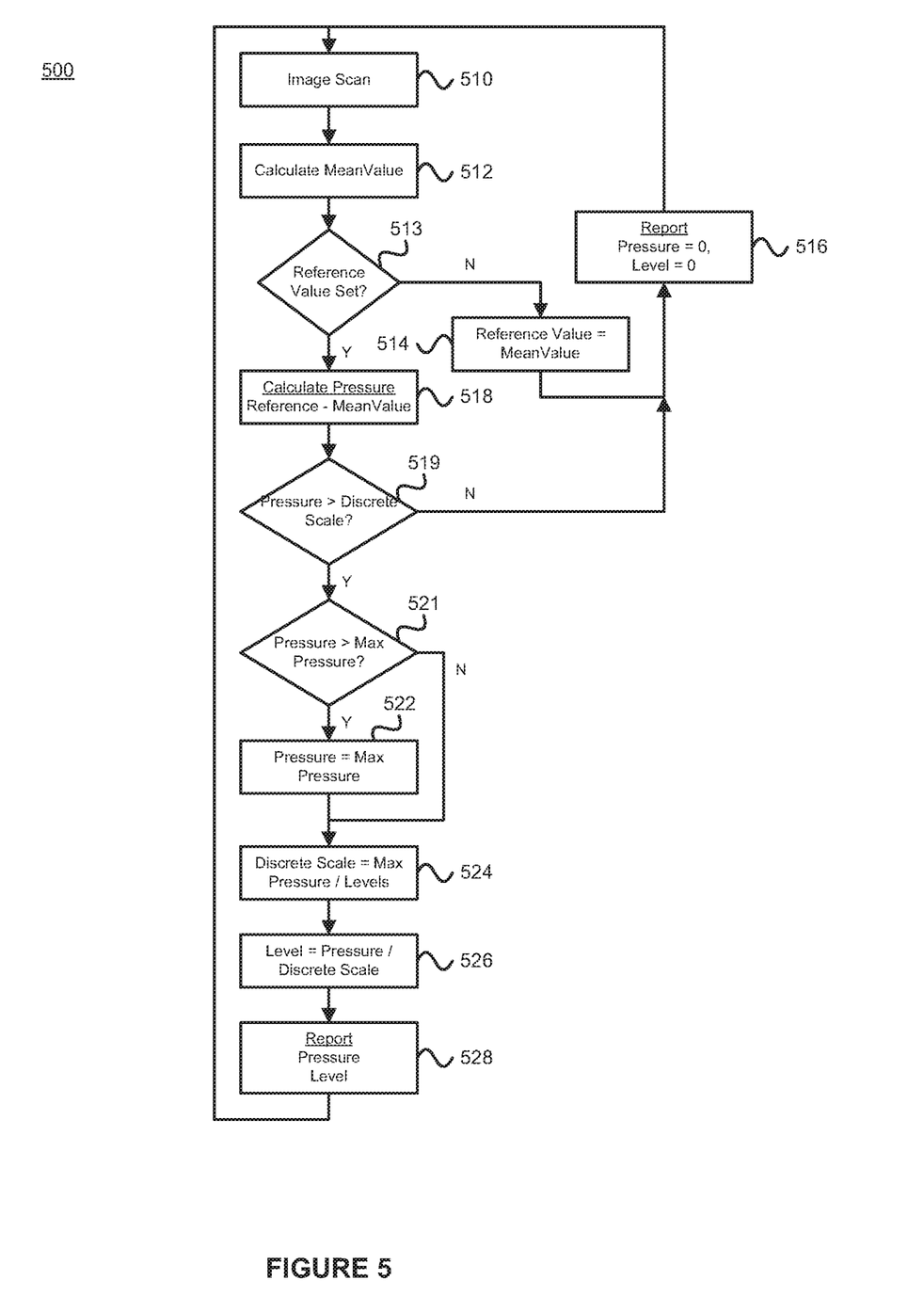
FIG. 5 illustrates a method for calculating or recognizing pressure on a fingerprint sensor, according to one embodiment.

FIG. 5 illustrates a method 500 for detecting pressure based on an imaged scan as illustrated in FIGS. 3 and 4. First, a fingerprint may be imaged (for example by scan engine 114 and imaging module 126 of FIG. 1). As stated above, fingerprint imaging may be an actual capture or it may be the generation of a digital output representative of a fingerprint in various embodiments. The change in values for each node or intersection of the fingerprint sensor under test may be calculated and averaged to generate a Mean-Value in step 512. In one embodiment, capacitance change values may be averaged to generate the MeanValue. One of ordinary skill in the art would understand that a change in values representative of ridges and values, however they are detected, may be used to generate the MeanValue. For example, in an optical fingerprint sensor the output the scan engine and imaging modules may produce an optical value that may be average to produce the MeanValue. In various other embodiments, resistance, impedance, or infra-red scanning (and MeanValue calculation) may be used.

Method 500 may check if a reference value is set in decision step 513. If a reference value is not set, the reference value may be set to the MeanValue in step 514 and the pressure and pressure levels reported as zero in step 516. In one embodiment, the reference value may be a minimum pressure or force corresponding to a pressure of force of a fingerprint not intended by the user for pressure detection and associated actions. Method 500 may then return to step 510. If the reference value was set in decision step 513, a pressure value may be calculated in step 518. The pressure value may be calculated by subtracting the MeanValue from the reference value to create a difference. The pressure value from step 518 may be compared to a first threshold representative of a minimum pressure (discrete scale) in decision step 519. If the pressure from step 518 is not great enough, an output pressure is reset to zero and is reported likewise along with a pressure level of zero in step 516. If the pressure output from step 518 is greater than a first threshold, it may then compared to a maximum pressure level in step 521. If the pressure from step 518 is greater than the maximum pressure level the pressure value is stored as the maximum pressure value in step 522. The discrete scale is then calculated by dividing the maximum pressure by the number of pressure levels for the device. Pressure levels may be determined during development and may be based on system or application requirements. Different pressure levels may have different ranges. In other words, some pressure levels may include more potential pressure values than others. If the pressure value from step 518 is not greater than the maximum pressure, the pressure level is calculated in step 526 by dividing the pressure value from step 518 by the discrete scale from step 524. The pressure and the pressure level are then reported in step 528.

Figure 6A:
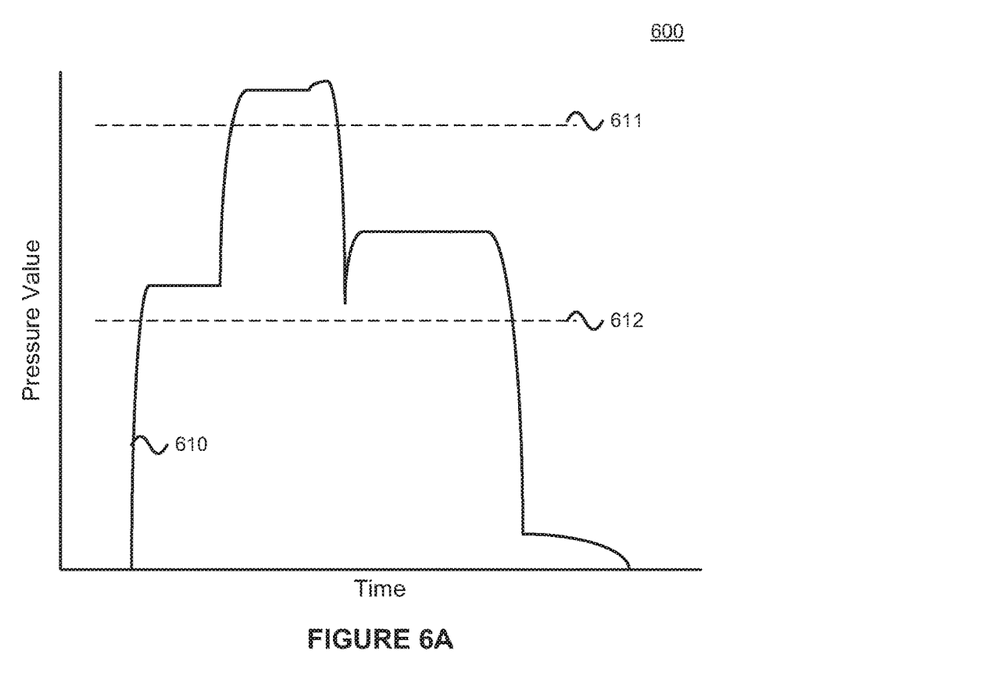
FIG. 6A illustrates pressure values representative of a force applied by a finger on a fingerprint sensor at various thresholds, according to one embodiment.
Figure 6B:
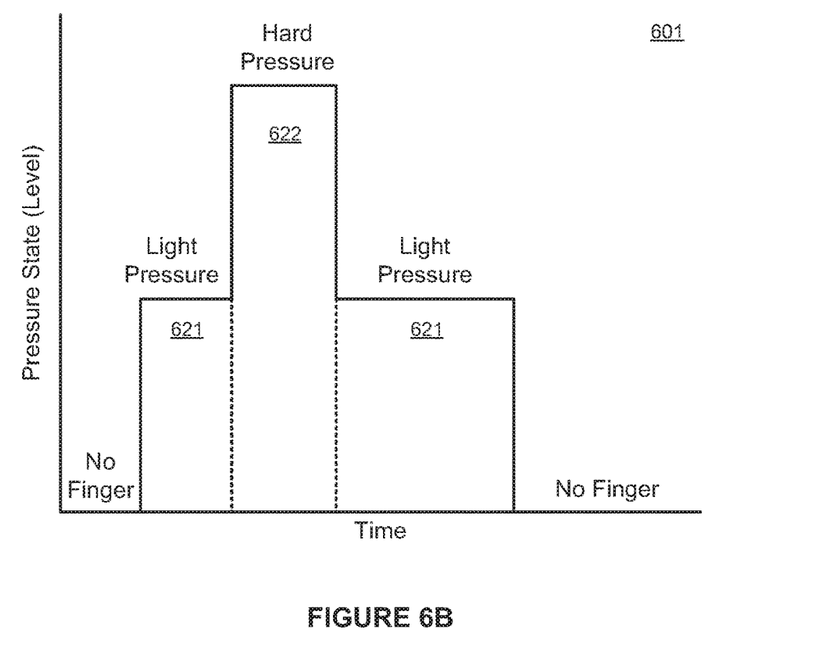
FIG. 6B illustrates pressure levels corresponding to various thresholds of pressure values representative of a force applied by a finger on a fingerprint sensor, according to one embodiment.

FIGS. 6A and 6B illustrate pressure values and the corresponding levels as would be calculated and generated by method 500. FIG. 6A illustrates a pressure value graph 600 of pressure over time. Line 610 is the pressure value calculated in step 518 of method 500. FIG. 6B illustrates a graph 601 the pressure states corresponding to the pressure value of line 610. As no pressure is detected, a state of "no finger" is output (by step 516 of method 500). As force increases the corresponding pressure value increases and is it compared to thresholds 611 and 612. As the pressure value passes threshold 611, a light pressure 621 is determined. The report from step 528 of method 500 is therefore the value of the pressure shown by line 610 and "light" or a representation thereof. As force continues to increase, the calculated pressure value may pass threshold 612, representative of a hard pressure 622. The report from step 528 of method 500 may then be the pressure value shown by line 610 and "hard" or a representation thereof. If force drops below threshold 612, step 528 may output the pressure value and "light" again. Finally, as force continues to drop, if it drops below the reference value, no pressure may be detected and a "no finger" state may be output.

Pressure can be useful information for gating other functions. For example, the force with which a fingerprint is applied to the fingerprint sensor may be used to determine whether a navigation mode (navigation module 128 of FIG. 1) is entered. If the force (and the corresponding pressure level) is low enough, navigation mode may be entered. Once the force (and the corresponding pressure level) is too high, the fingerprint sensor may cease navigation operation or enter into other operations modes as discussed with regard to FIG. 1.

Figure 7:
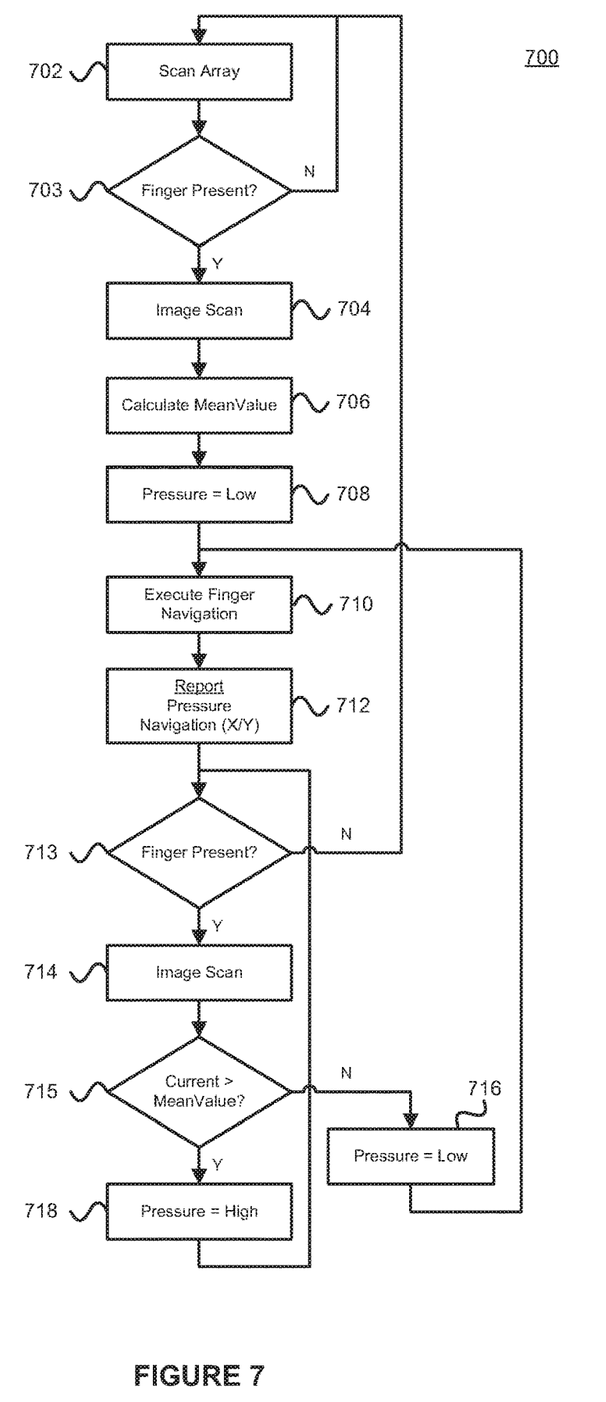
FIG. 7 illustrates a method for entering finger navigation mode with sensed pressure on a fingerprint sensor, according to one embodiment.

FIG. 7 illustrates a method 700 for determining when to enter a navigation mode using pressure values. First an array of sensors may be scanned step 702. In one embodiment, this scan may be only of a subset of the array sufficient to detect a finger. In another embodiment, the scan of step 702 may be the entire array, but for a time that is too short to image a fingerprint but long enough to detect the presence or absence of a conductive object. In still another embodiment, the scan of step 702 may be a full fingerprint scan. Next, the output of step 702 may be processed to determine if a finger or other conductive object is present on the fingerprint sensor in step 703. If there is no finger or other conductive object, method 700 may return to step 702 and scan the array of sensors again. If there is a finger or other conductive object present, the array may be scanned again, this time with full resolution in step 704. The image scan of step 704 may be similar to the image scan of step 510 of method 500. The image from step 704 may be used to calculate a MeanValue in step 706 similar to step 518 of method 500, by taking the average change in capacitance (or other measurement) over the intersections or nodes under test. At this stage, the pressure state to may be set to "low" in step 708 and finger navigation mode may be entered in step 710. In one embodiment, finger navigation mode may involve changing the operation of scan engine 114 of FIG. 1 and processing information from scan engine 114 through navigation module 128, rather than through imaging module 126. Once in finger navigation mode, pressure and navigation information (X and Y values) may be reported in step 712.

If in decision step 713, a finger is not present, method 700 may return to the beginning and scan the array again in step 702. If in decision step 713 a finger is present, fingerprint imaging may continue and an image may be scanned again in step 714. The current MeanValue from the image scan may be calculated similarly as in method 500 of FIG. 5 and then compared to a stored MeanValue in decision step 715. If the current MeanValue is greater than a stored MeanValue, the pressure may be determined to be high in step 716. If the current MeanValue is not greater than a stored MeanValue, the pressure may be determined to be low in step 718. Method 700 may then return to step 702 to scan the array again.

The above methods have described force or pressure measurement and calculation methods that use information from the fingerprint array. However, it may be possible to use embedded capacitors already in-system to measure force or pressure. Embedded capacitors may be used for baselining and temperature drift compensation. For example, calibration module 116 of FIG. 1 may use the measurement or connection of capacitors that are inaccessible to an activating element to monitor environmental changes. These capacitors may also be used to measure force or pressure.

Figure 8:
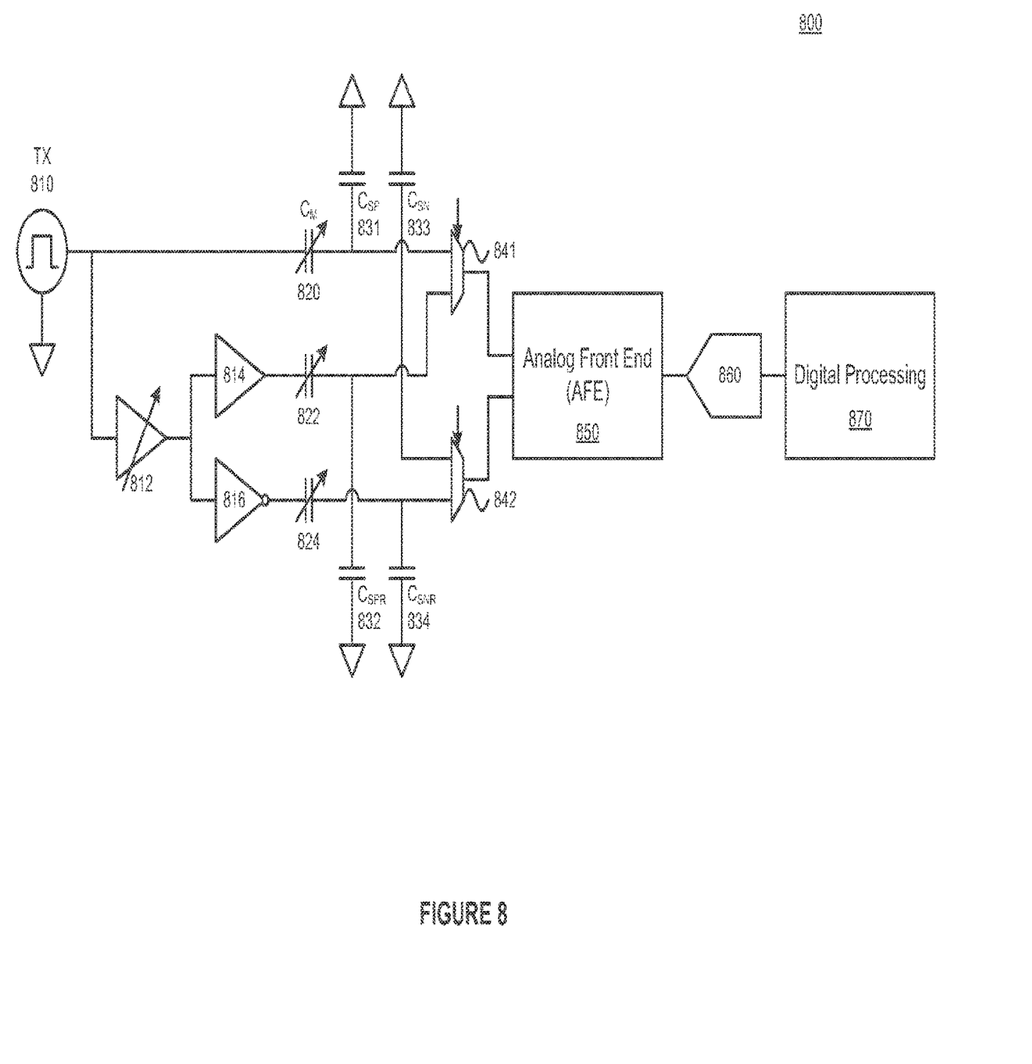
FIG. 8 illustrates circuit for measuring or detecting pressure using variable embedded capacitors, according to one embodiment.

FIG. 8 illustrates a circuit 800 that may use embedded capacitors as reference capacitors for pressure detection and measurement. Circuit 800 may include a signal generator TX 810 coupled to a first plate of a mutual capacitor 820. In one embodiment, mutual capacitor 820 may be formed at the intersection of two electrodes of sensing electrodes 101. In this embodiment, the second plate of mutual capacitor is coupled to the capacitance-to-digital conversion circuit or scan engine 114 of processing circuitry 110 of FIG. 1. TX 810 may also be coupled to a programmable gain amplifier, which is then coupled to the first plates of two variable capacitors 822 and 824 through amplifiers 814 and 816, respectively. In one embodiment, amplifier 816 is an inverting amplifier. The second plates of variable capacitors 822 and 824 may be coupled to the capacitance-to-digital conversion circuit. As stated above, variable capacitors 822 and 824 may be embedded in the system such that they are not changed by the presence of a conductive object or a fingerprint. Rather, as the system changes mechanically, variable capacitors 822 and 824 may be deformed. This deformation may result in a measurable change in the capacitance of variable capacitors 822 and 824. Mutual capacitor 820 and variable capacitors 822 and 824 may be coupled to analog from end (AFE) 850 through a pair of multiplexors 841 and 842. Multiplexor 841 may be coupled to capacitors 831 and 832. Multiplexor 842 may be coupled to capacitors 833 and 834. The parallel capacitances of capacitors coupled to multiplexor 841 and 842 may be part of the conversion of AFE 850; AFE 850 may be configured as part of the capacitance-to-digital conversion circuit or scan engine 114 of FIG. 1. AFE 850 may produce a voltage or other signal representative of the capacitance of mutual capacitor 820 and variable capacitors 822 and 824. The output of AFE 850 may be converted to a digital value by analog-to-digital converter 860. The output of analog-to-digital converter 860 may be a digital value that is further processed by digital processing module 870. In various embodiments, digital processing module 870 may include low power finger detection module 132, false finger rejection module 134, image buffer 136, movement calculation module 138, pressure detection module 130, and other downstream processing modules described above with regard to FIG. 1.

The embodiment of FIG. 8 is not dependent on the capacitive properties of a user's finger (or fingerprint) as it is the physical deformation of a discrete capacitance that is measured and processed as pressure. However, the physical deformation that causes the capacitance change may introduce a delay in the recovery of the capacitance to non-touched levels.

Figure 9:
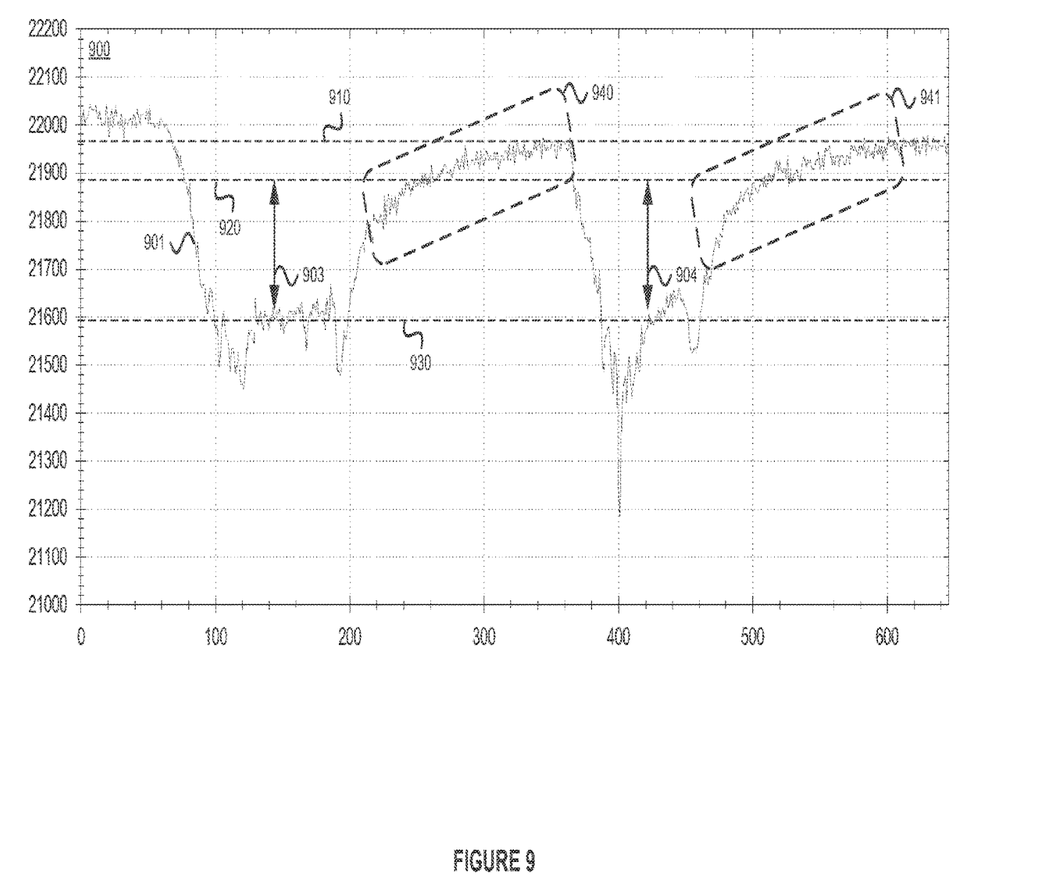
FIG. 9 illustrates capacitive response and pressure thresholds for variable embedded capacitors, according to one embodiment.

FIG. 9 illustrates the capacitive response of embedded capacitors as described above with regard to FIG. 8. Graph 900 shows the digital conversion values over time as line 901. A first threshold 910 establishes whether or not a finger or other object is present on the sensor. As a note, the embedded capacitors do not require a conductive object for pressure detection. As they are not influenced by the user directly, but rather the force applied, the actuating element may be non-conductive. As the counts from the conversion drop below a second threshold 920, a light touch may be detected, but very little pressure or force. As more force is applied and the embedded capacitors are more deformed, capacitance change increases. If the differences 903 and 904 between a light touch and a hard press is detected by the conversion values dropping below a third threshold 930, a hard press is recognized. As stated above, recovery times 940 and 941 of this circuit may be longer as the physical deformation must also recover. However, this may be ameliorated with the use of more responsive, spring-like materials.

Figure 10A:
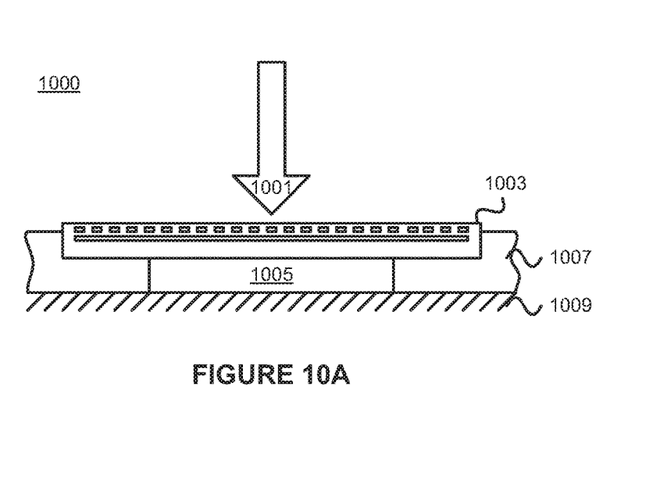
FIG. 10A illustrates a fingerprint sensor disposed over a pressure sensing circuit, according to one embodiment.

In still another embodiment, a force sensor that is designed to detect physical deformation FIG. 10A illustrates one embodiment of a system 1000 where a fingerprint sensor 1003 is disposed over a force sensor 1005 and embedded in a substrate 1007. System 1000 may be disposed on a device 1009. Device 1009 may be a mobile phone or other portable device in one embodiment. In other embodiments, device 1009 may be a front panel display, a steering wheel, a door handle, or any other device that may be featured to include fingerprint sensing and uses pressure or force detection. System 1000 may be configured to receive a pressure a force 1001 applied to the accessible surface of fingerprint sensor 1003, which is then transmitted to force sensor 1005.

Figure 10B:
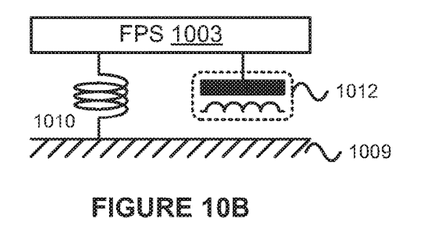
FIG. 10B illustrates a fingerprint sensor disposed over an inductive pressure sensing circuit, according to one embodiment.
Figure 10C:
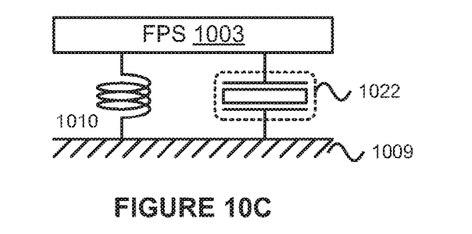
FIG. 10C illustrates a fingerprint sensor disposed over a piezoelectric pressure sensing circuit, according to one embodiment.
Figure 10D:
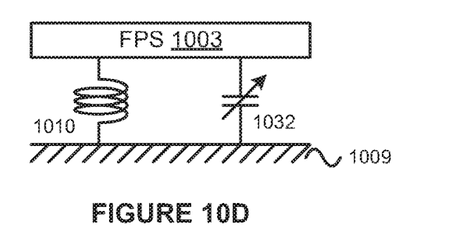
FIG. 10D illustrates a fingerprint sensor disposed over a capacitive pressure sensing circuit, according to one embodiment.
Figure 10E:
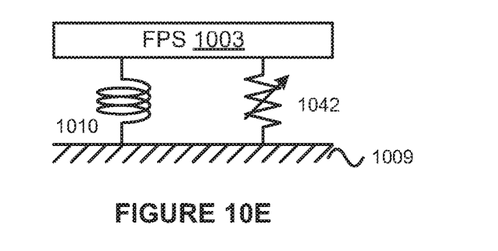
FIG. 10E illustrates a fingerprint sensor disposed over a resistive pressure sensing circuit, according to one embodiment.
Figure 10F:
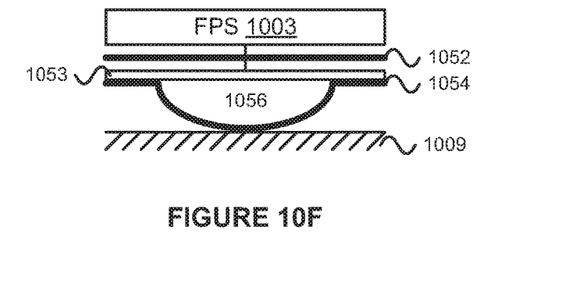
FIG. 10F illustrates a fingerprint sensor disposed over a mechanical, capacitive pressure sensing circuit, according to one embodiment.

FIGS. 10B-10F illustrate various embodiments of system 1000 using various force sensors and physical constructions. In FIG. 10B, force sensor 1005 may include a spring 1010 and an inductive force sensor 1012 that is configured to measure a change in inductance when a piece of ferrous material is closer for farther from the inductor. In FIG. 10C, force sensor 1005 may include spring 1010 and a piezoelectric element 1022. In FIG. 10D, force sensor 1005 may include spring 1010 and a variable capacitor 1032. Variable capacitor 1032 may be similar to variable capacitors 822 and 824 of FIG. 8, or it may have a construction that is more optimized for force detection and not used also for baseline and drift compensation. In FIG. 10E, force sensor 1005 my include spring 1010 and a variable resistor 1042 which may be changed with the application of force. Force detection may then be measured through known resistance measurement methods. Finally, in FIG. 10F, force sensor 1005 may include capacitor plates 1052 and 1054 that are separated by isolator 1053. A space 1056 in capacitor plate 1054 may allow the force sensor to depress and a greater portion of plate 1054 to be close to plate 1052, increasing the capacitance. This is similar to, the embodiments shown in FIGS. 8 and 10D.

The embodiments described herein may be used in various designs of mutual-capacitance sensing arrays of the capacitance sensing system, or in self-capacitance sensing arrays. In one embodiment, the capacitance sensing system detects multiple sense elements that are activated in the array, and can analyze a signal pattern on the neighboring sense elements to separate noise from actual signal. The embodiments described herein are not tied to a particular capacitive sensing solution and can be used as well with other sensing solutions, including optical sensing solutions, as would be appreciated by one of ordinary skill in the art having the benefit of this disclosure.

In the above description, numerous details are set forth. It will be apparent, however, to one of ordinary skill in the art having the benefit of this disclosure, that embodiments of the present invention may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "encrypting," "decrypting," "storing," "providing," "deriving," "obtaining," "receiving," "authenticating," "deleting," "executing," "requesting," "communicating," or the like, refer to the actions and processes of a computing system, or similar electronic computing device, that manipulates and transforms data represented as physical (e.g., electronic) quantities within the computing system's registers and memories into other data similarly represented as physical quantities within the computing system memories or registers or other such information storage, transmission or display devices.

The words "example" or "exemplary" are used herein to mean serving as an example, instance or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or." That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Embodiments described herein may also relate to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer-readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory, or any type of media suitable for storing electronic instructions. The term "computer-readable storage medium" should be taken to include a single medium or multiple media (e.g., a centralized or distributed database and/or associated caches and servers) that store one or more sets of instructions. The term "computer-readable medium" shall also be taken to include any medium that is capable of storing, encoding or carrying a set of instructions for execution by the machine and that causes the machine to perform any one or more of the methodologies of the present embodiments. The term "computer-readable storage medium" shall accordingly be taken to include, but not be limited to, solid-state memories, optical media, magnetic media, any medium that is capable of storing a set of instructions for execution by the machine and that causes the machine to perform any one or more of the methodologies of the present embodiments.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the embodiments as described herein.

The above description sets forth numerous specific details such as examples of specific systems, components, methods and so forth, in order to provide a good understanding of several embodiments described herein. It will be apparent to one skilled in the art, however, that at least some embodiments may be practiced without these specific details. In other instances, well-known components or methods are not described in detail or are presented in simple block diagram format in order to avoid unnecessarily obscuring the present invention. Thus, the specific details set forth above are merely exemplary. Particular implementations may vary from these exemplary details and still be contemplated to be within the scope of the claimed subject matter.

It is to be understood that the above description is intended to be illustrative and not restrictive. Many other embodiments will be apparent to those of skill in the art upon reading and understanding the above description. The scope of the claimed subject matter should, therefore, be determined with reference to the appended claims, along with the full scope of equivalents to which such claims are entitled.

What is claimed is:

1. A method comprising:
    converting a mutual capacitance formed at each of a plurality of nodes of a sensing array disposed beneath a surface to a digital value;
    comparing digital values for at least one of the plurality of nodes with the highest digital value to at least one of the plurality of nodes with the lowest digital value; and
    based on the comparison, calculating a difference value, the difference value representative of an amount of force applied to the surface by a conductive object.

2. The method of claim 1, wherein the plurality of nodes are formed as intersections between a first plurality of electrodes disposed along a first axis and a second plurality of electrodes disposed along a second axis, and wherein the mutual capacitance is formed between the first plurality of electrodes and the second plurality of electrodes.

3. The method of claim 1, wherein the plurality of nodes is a subset of all nodes of the sensing array.

4. The method of claim 3, wherein the subset of all of the nodes of the sensing array comprises only nodes with digital values greater than a threshold corresponding to a presence of a conductive object at the node.

5. The method of claim 1, further comprising:
    comparing the difference value to a maximum value;
    if the difference value is greater than the maximum value, updating the maximum value with the difference value; and
    if the difference value is not greater than the maximum value, converting the difference value to one of a plurality of levels, each of the plurality of levels representative of a different range of force applied to the surface.

6. The method of claim 5, further comprising reporting the difference value and the one of the plurality of levels to an external device.

7. The method of claim 1, further comprising:
    comparing the pressure value to a first threshold; and
    if the difference value is less than the first threshold, processing the converted mutual capacitance on the plurality of nodes as navigation information of the conductive object on the sensing array.

8. The method of claim 1, wherein the sensing array is a fingerprint sensor.

9. A fingerprint sensing device comprising:
    a scan engine configured to convert a plurality of capacitances coupled to a plurality of inputs of the fingerprint sensing device to a plurality of digital values;
    an imaging module to configured convert the plurality of digital values into a representation of a fingerprint;
    a force measurement module configured to compare maximum capacitance values to minimum capacitance values and, based on the comparison determining a measure of force applied to a surface by a conductive object.

10. The fingerprint sensing device of claim 9, wherein the capacitance is a mutual capacitance formed between a first electrode disposed along a first axis and a second electrode disposed along a second axis.

11. The fingerprint sensing device of claim 9, further comprising a scan mode selector module configured select a mode for the scan mode, in part, based on an output of the force measurement module.

12. The fingerprint sensing device of claim 9 further comprising a navigation module configured to generate navigation information based on outputs from the imaging module, the navigation module active if a digital value representative of the force applied is below a threshold.

13. The fingerprint sensing device of claim 9, wherein the force measurement module is configured to convert a digital value representative of the force applied to the surface.

14. The fingerprint sensing device of claim 9, wherein the representation of the fingerprint is an image corresponding to a plurality of ridges and valleys of the fingerprint represented by capacitance change.

15. The fingerprint sensing device of claim 9, wherein the plurality of inputs is fewer than the total number of inputs of the fingerprint sensing device.

16. A system comprising:
    a first plurality of electrodes disposed along a first axis;
    a second plurality of electrodes disposed along a second axis, each of the first and second pluralities of electrodes forming a mutual capacitance between them;
    a measurement circuit coupled to the first plurality of electrodes, the measurement circuit configured to convert the mutual capacitance into a digital value;
    an imaging module configured to convert the mutual capacitance formed between the first and second pluralities of electrodes into an image representative of a fingerprint on a surface above the first and second pluralities of electrodes; and a force measurement module configured to convert the representation of the fingerprint into a digital value, the force measurement module configured to compare maximum capacitance values to minimum capacitance values and, based on the comparison determining a measure of force applied to a surface by a conductive object.

17. The system of claim 16 further comprising a navigation module configured to convert the image to navigation information, the navigation module enabled when the digital value is less than a threshold.

18. The system of claim 16, wherein the digital value is an average of the digital values representative of the mutual capacitances formed between the first and second pluralities of electrodes.

19. The system of claim 16 further comprising a scan mode selector module to configure the measurement circuit for a plurality scan modes including fingerprint imaging, force measurement, and navigation.

20. The system of claim 16 further comprising a gesture detection module, the gesture detection module configured to receive pressure information and translate the force information into user interactions, the force information derived from the digital value.

* * * * *